United States Patent
Baumgard et al.

(10) Patent No.: US 6,315,966 B1
(45) Date of Patent: Nov. 13, 2001

(54) CRYSTALLIZATION PROCESS AND DEVICE

(75) Inventors: Hans-Dieter Baumgard, Holzminden; Bernhard Haedke, Nördlingen; Josef Himmelreich, Holzminden; Helmut Judat, Langenfeld, all of (DE)

(73) Assignee: Haarmann & Reimer GmbH, Holzminden (DE)

( * ) Notice: Subject to any disclaimer, the term of this patent is extended or adjusted under 35 U.S.C. 154(b) by 0 days.

(21) Appl. No.: 09/202,436

(22) PCT Filed: Jul. 1, 1997

(86) PCT No.: PCT/EP97/03440

§ 371 Date: Dec. 15, 1998

§ 102(e) Date: Dec. 15, 1998

(87) PCT Pub. No.: WO98/01204

PCT Pub. Date: Jan. 15, 1998

(30) Foreign Application Priority Data

Jul. 5, 1996 (DE) .............................................. 196 27 066

(51) Int. Cl.[7] ........................................................ B01D 9/00
(52) U.S. Cl. ...................... 422/245.1; 117/200; 117/206; 117/900; 23/301; 422/258; 422/259
(58) Field of Search ..................................... 117/200, 206, 117/900; 422/245.1, 255, 258, 259, 260; 23/301

(56) References Cited

U.S. PATENT DOCUMENTS

| | | |
|---|---|---|
| 3,266,871 | 8/1966 | Mizoguchi et al. . |
| 3,450,751 | 6/1969 | Moyori et al. . |
| 3,892,539 | 7/1975 | Milder, Jr. . |

FOREIGN PATENT DOCUMENTS

| | | |
|---|---|---|
| 365 053 A | 12/1962 | (CH) . |
| 0 216 702 A | 4/1987 | (EP) . |
| 0 484 769 A | 5/1992 | (EP) . |
| 460 834 A | 2/1937 | (GB) . |
| 865 311 A | 4/1961 | (GB) . |

OTHER PUBLICATIONS

T. Yoshida, "Industrielle Herstellung von optisch aktiver Glutaminsäure durch Totalsynthese", Chemie–Ing.–Techn. vol. 42, 1970, No. 9/10, pp. 641–644.

Chemical Engineering, Nov. 8, 1965, MERCK Achievement—"First commercial, continuous process to use selective crystallization separates optically active isomers", pp. 247–248.

*Primary Examiner*—Felisa Hiteshew
(74) *Attorney, Agent, or Firm*—Norris McLaughlin & Marcus

(57) ABSTRACT

Continuously operated, two-part crystallizer which is particularly suitable for the resolution of racemic mixtures, and process for separating solid mixtures which are difficult to separate, in particular racemates.

15 Claims, 6 Drawing Sheets

Section A-A'

Section B-B'

CRYSTALLIZATION PROCESS AND DEVICE

The present invention relates to a continuously operated, two-part crystallizer which is particularly suitable for the resolution of racemic mixtures, and also a separation process for solids mixtures which are difficult to separate, in particular for racemates, using the crystallizer.

In the synthesis of racemates, the two enantiomers are formed in equal amounts, since they have the same energy content. However, it is often the case that only one of the two stereoisomeric forms is required, for example, the 1-amino acids for the formation of proteins. It is therefore necessary to separate the racemate into its optically active components, the l and d forms. The crystallization method has, among other methods, proven useful for the separation of stereoisomers. It is based on the principle that the desired optically active isomer crystallizes preferentially from a supersaturated solution of the racemate when the solution is seeded with a few crystals of this isomer. Examples of this are the separation of the ammonium salt of acylated tryptophan and acylated phenylalanine. Derivatives of aromatic sulphonic acids can likewise be separated in this way, e.g. dl-lysine as the sulphanilic acid salt and dl-serine as the m-xylenesulphonate.

To carry out the crystallization process, various types of apparatus have been proposed. U.S. Pat. No. 3,450,751 describes the use of a tube reactor in which backmixing is very largely prevented for the resolution of racemic glutamic acid, glutamates and their derivatives. A disadvantage of this process is the necessity of continually having to introduce seed crystals of the desired enantiomer into the supersaturated solution of the racemate.

U.S. Pat. No. 3,266,871 proposes the use of a cylindrical vessel which has a conical bottom and is divided into two zones by a wire mesh as crystallizer for the resolution of glutamic acid and its hydrochloride. The mesh opening of the wire mesh is selected such that the seed crystals cannot get into the other part of the vessel while the supersaturated racemic solution can, of course, pass through the wire mesh. Each part of the vessel is equipped with a propeller stirrer which suspends the seed crystals homogeneously in the respective zone. According to the examples in U.S. Pat. No. 3,266,871, this apparatus gives the following results in the resolution of glutamic acid:

| Example | Mean residence time (min) | Temperature (° C.) | Duration of the process (h) | Purity of the l-acid (%) | d-Glutamic acid (%) |
|---|---|---|---|---|---|
| 1 | 7.5 | 50 | 10 | 92.3 | 92.5 |
| 2 | 6.0 | 50 | 7 | 96.4 | 95.6 |

The optical purity of the seed crystals added was 98%. It is conspicuous that, at a constant resolution temperature of 50° C., the purity of the 1-acid after only 7 hours is only 96.4% and after 10 hours is as low as 92.3%. This indicates that although the wire mesh is impermeable to the seed crystals used, it does not present an effective obstacle to very small crystal nuclei. This fact is essentially confirmed in the journal Chemie-Ing.-Techn. Vol. 42, 1970/No. 9/10, pp. 641–644, according to which the industrial resolution of the salt of dl-glutamic acid is carried out at 55° C. in a comparable arrangement and is interrupted after seven hours: the crystals (whose optical purity is at least 95%) are separated off, new seed crystals are added and the entire procedure is repeated. The arrangement thus does not make a genuine continuous process possible, since the crystallized material is regularly replaced completely by new seed crystals at relatively short time intervals.

The contamination of the desired enantiomer with crystals of its mirror image could be prevented if the two ideally mixed zones are completely separated from one another, i.e. if two separate stirred vessels are used. However, the question then arises, as to how the racemic solution gets from vessel to vessel without carrying crystals with it.

A solution to this problem is described, by way of example, for the resolution α-methyl-3,4-dihydroxyphenylalanine (α-methyl DOPA) in the journal Chemical Engineering, Nov. 8, 1965, pp. 247–248. According to this publication, two stirred vessels are operated in parallel and equal amounts of the supersaturated racemic solution are fed to each. Each vessel is equipped with a suspension pump which conveys the crystal suspension through a special filter. In this motor-driven filter, the filtrate is separated off and returned to the dissolution vessel for enrichment. The thickened suspension flows back into the respective crystallizer.

The disadvantage of this apparatus is finding a suitable filter for separating the filtrate from the crystals. Since no known filter meets the requirements, the authors of the abovementioned article have built a special filter themselves; however, the abovementioned article gives no further details as to the nature of this filter.

U.S. Pat No. 3,892,539 attempts to solve the indicated separation problem for enantiomers by carrying out the selective crystallization in fluidized beds. These consist of a lower part which has a conical configuration and tapers towards the bottom and an upper part which is cylindrical. At the bottom end of the fluidized bed there is an ultrasonic device which breaks up large crystals which settle out. For the resolution of racemic mixtures, preference is given to connecting two fluidized beds in series. The supersaturated racemic solution enters the bottom of the first fluidized-bed crystallizer which is provided with seed crystals of one enantiomer. The seed crystals grow and, depending on their size and the flow velocity of the solution, assume a particular vertical position in the crystallizer. The smallest crystals form a boundary layer in the lower part of the cylindrical bed. In this region, site glasses are provided at various heights of the column, thus enabling the position of the boundary layer to be observed and, based on this, the removal of crystals to be carried out when appropriate. The solution which has been depleted in the respective enantiomer and enriched with the opposite enantiomer leaves the cylindrical fluidized bed at the top and flows to the second fluidized-bed crystallizer arranged downstream.

In the apparatus described, filtration of the solution leaving the first fluidized bed can be omitted provided that, in particular, sedimentation of the smallest nuclei in the upper part of the fluidized bed (above the boundary layer of the crystals) is 100% effective. The flow velocity of the solution keeps the smallest seed crystals in suspension in the lower region of the cylindrical fluidized bed; there is therefore a risk that the significantly smaller crystal nuclei will be carried out at the same flow velocity. Furthermore, the apparatus described in U.S. Pat. No. 3,892,539 has the considerable disadvantage that it is not really possible to change the throughput during operation of the apparatus, because this is associated with an appreciable change in the position of the microcrystal boundary layer.

This makes steady-state operation of the crystallization apparatus considerably more difficult.

It is an object of the invention to develop a crystallization apparatus which should make genuine continuous operation for weeks and months possible and does not have the abovementioned disadvantages.

The seed crystals of one enantiomer should be added only once at the beginning of the production cycle.

The solids concentration should be kept as high as possible in order to achieve (at very low supersaturation) a high space-time yield.

However, the mixing of the solids suspension should nevertheless be homogeneous, i.e. all volume elements of the suspension should have the same particle size distribution.

The crystals obtainable from the crystallizer should be sufficiently large for them to be separated off readily by mechanical means.

The supersaturated feed solution of the enantiomers should be mixed as quickly as possible with the overall solids suspension so that the supersaturation is quickly reduced.

The solution enriched in one enantiomer should flow from the crystallization apparatus as a clear solution without carrying with it the solid phase of the respective enantiomer, not even in the form of fine nuclei, so as to avoid poisoning of the crystallizers for a very long period of time.

The purity of the individual components obtained from the crystallizer should, if possible, be greater than 99%.

The throughput of solution to be resolved should be able to be varied greatly within wide limits (±30%) without particular modifications of the apparatus being necessary.

This object is achieved according to the invention by a crystallization apparatus which is subject-matter of the invention and is suitable, in particular, for the crystallization of solids which are difficult to separate, preferably for the resolution of racemic mixtures, from their solutions, comprising an upper part and a lower part, with a heatable and coolable stirred vessel as lower part which has an agitator, optionally a feed line for the crystallization solution and optionally a discharge line for the suspension of the crystallized product, and with a conical, heatable and coolable sedimentation section as upper part which has a stirring element running around the wall, optionally a discharge line for the solution depleted in the product and an opening to the stirred vessel, where the agitator generates, in the region of the opening, flow of the crystallization solution directed away from the opening.

The agitator is preferably a radial-flow agitator, in particular an impeller stirrer driven from below, a straight-arm stirrer, a flat-paddle stirrer or a CBT turbine. The agitator can also be an axial-flow agitator which is arranged in a guide tube below the opening.

The axial-flow agitator is, in particular, installed on the central axis of the stirred vessel in order to generate the flow directed away from the opening.

The stirring element running around the wall is, in particular, a slow-running blade stirrer which is driven from above and preferably has an additional frame which wipes across the inner wall of the sedimentation section and thereby keeps it free of deposited crystals.

In a particular embodiment of the invention, the stirring elements running around the wall is designed so as to be heatable or coolable, for example by means of electric resistance heating or with the aid of a system for passing a heat-transfer medium through it.

In the preferred embodiment, the cone widening towards the top of the sedimentation section has an opening angle of from 10 to 60°, in particular from 20 to 50°, preferably from 25 to 45°.

The sedimentation section and the stirred vessel are preferably provided with an additional temperature-control facility which makes it possible to set the temperature of the reactor contents. Thus, the sedimentation section or the stirred vessel can have a double wall with feed and discharge lines for a heat-transfer medium which is passed through within the double wall for cooling or heating the crystallization solution.

In a further, preferred variant, the stirred vessel is provided with an additional pumped circulation loop with heat exchanger which makes it possible to take a substream of the crystal suspension from the intensively stirred stirred vessel via the pumped circulation loop, to heat it by preferably from 0.1 to 5° C. in the heat exchanger and subsequently to return it to the stirred vessel.

Since internal fittings for directing the flow can in many cases not be used because of the risk of deposits of solid, the agitator selected for the stirred vessel is preferably one which generates a high circulation rate even without guide plates. Such an agitator is the impeller stirrer which is arranged at the bottom of the stirred vessel and generates upward flow in the vicinity of the preferably cylindrical wall of the vessel.

In a particularly preferred embodiment of the invention, the flow of the crystallization solution turns toward the middle of the vessel after a distance of, for example, about one vessel diameter and then flows vertically downwards in the vessel below the opening to the sedimentation section. In the vicinity of the bottom, the central, primarily axial downward flow is then accelerated radially by the impeller stirrer and forced upwards by the contour the curved bottom. This generates strong circulation which is very pronounced even in the case of relatively viscous crystal slurries.

The deflection of the flow by 180° in the upper region of the stirred vessel is reinforced by appropriate shaping of the lid of the stirred vessel and the sedimentation section is joined on in this central region of the flow directed axially downwards.

The sedimentation section of the apparatus is advantageously conical and its point forms the connection to the intensively stirred crystal slurry zone. So that the turbulence of the crystal slurry is not propagated into the sedimentation section, the region where the sedimentation section and the stirred vessel are joined is provided with a slow-running stirring element, e.g. a four-bladed blade stirrer which breaks the secondary flow of the crystal slurry (the rotation). The preferred blade stirrer is, in particular, borne by a frame which has the conical contour of the sedimentation zone and can be heated or cooled. The stirring element which runs around the wall, e.g. the frame including blade stirrer, is slowly turned like a rabbling device (e.g. by a few revolutions per hour) in order to return the solid which has deposited on the conical surface to the crystallization zone. This makes it possible, despite an intensively stirred crystallization zone, to join on a sedimentation zone in the sedimentation section which is virtually uninfluenced thereby and from which the desired clear solution can be taken off at the top of the sedimentation section without interfering crystal nuclei.

Owing to the sometimes very great differences between the rotational speeds of the agitator and the rabbling device, it is particularly appropriate to choose two drives and to drive the agitator from below. This has the advantage that there is no long shaft rotating in the crystallization zone of the stirred vessel, which could possibly be subject to caking.

Furthermore, the use of a bottom drive gives quieter running. It is of course also possible to have a variable-speed drive for the agitator so as to take account of changes in the operating conditions (for example a change in the solids concentration or the desired mean particle size of the crystals).

The new crystallizer can be advantageously used for the continuous resolution of racemic mixtures, using one crystallizer for each component of the racemate. These can be connected in parallel or in series.

The invention also provides a process for separating enantiomers of a racemic mixture using the crystallization apparatus of the invention, which process is characterized in that a supersaturated solution of the racemate is fed to the stirred vessel and is intensively mixed with seed crystals of one enantiomer by means of the agitator, the flow of the resulting suspension is calmed with the aid of a slow-turning stirring element which runs around the wall in the sedimentation section and any further product crystals formed on the inner wall of the sedimentation section are removed and the solution depleted in the enantiomer is discharged at the top of the sedimentation section.

In a preferred process, two or more crystallization apparatuses of the invention are connected in series or in parallel and are operated continuously.

In particular, when two crystallization apparatuses are connected in series, the discharge line of the first crystallization apparatus is connected to the feed line of the second crystallization apparatus and different seed crystals of the opposite enantiomers are used in the two apparatuses.

When the apparatuses are connected in parallel, advantages which become apparent are not only the high space-time yield of the crystallization but also, in particular, the great reliability of the maintenance-free separation apparatus (compared with, for example, the special filters employed in the prior art), so that the separation process does not have to be interrupted because of difficulties with suspension pumps or, for example, filters. However, the particular strength of the crystallizer, namely the absolutely clear solution output, is brought to bear even more effectively when the crystallizers are connected in series. In this preferred process variant, the solution which has been depleted in one optically active component and enriched with the other component flows from the first crystallizer via a heat exchanger to the second crystallizer. There, poisoning would be caused immediately if crystallization nuclei from the first crystallizer had been carried into the second. The purity of the products obtained and the duration of the production process are therefore an index of the quality of solids separation.

The ratio of solid crystals to total suspension can be 5–85% by weight, preferably 15–70% by weight, particularly preferably 20–65% by weight.

The invention also provides for the use of the apparatus of the invention for resolving racemic mixtures by means of crystallization.

As regards the purity of the products, it may be mentioned that, for example, a purity of better than 99.9% has been achieved in the industrial resolution of d,l-menthol esters in two crystallizers according to the invention connected in series, and the production time was 6–8 months.

The invention is illustrated below by way of example with the aid of the figures.

EXAMPLE

Figure 1:
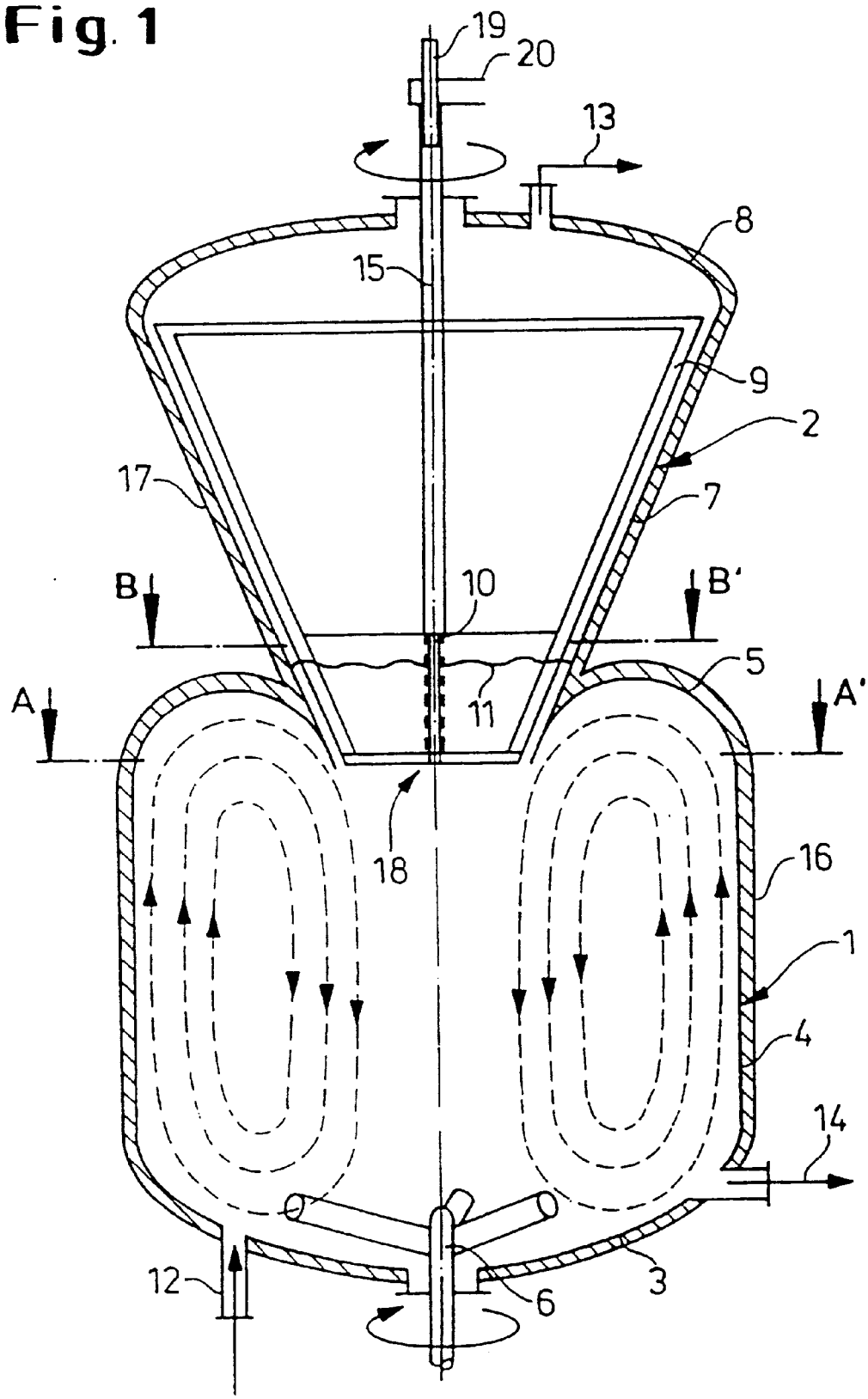
FIG. 1 shows an illustrative embodiment of the crystallization apparatus of the invention.
Figure 2:
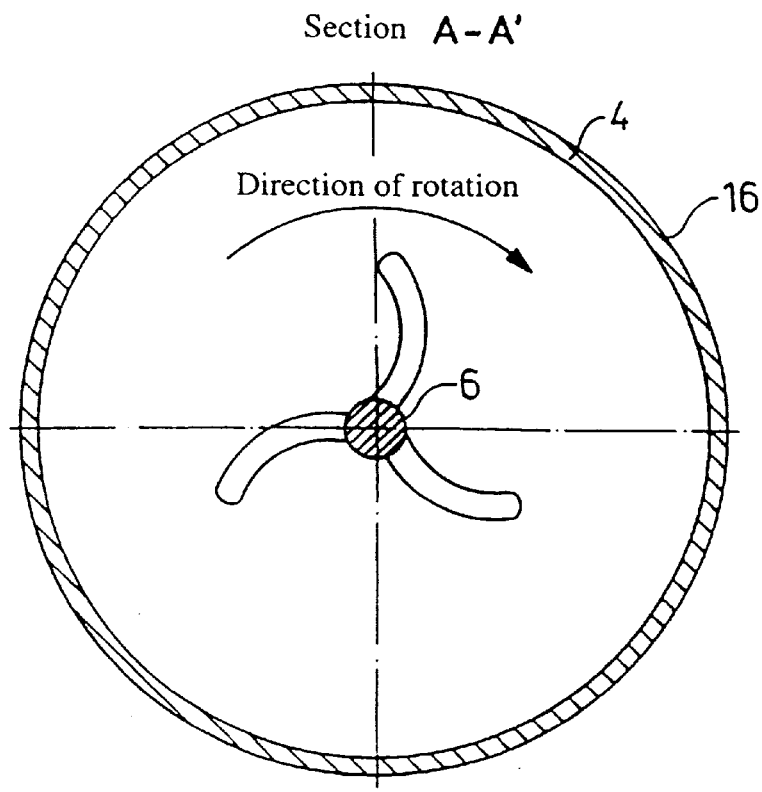
FIG. 2 shows a cross section through the stirred vessel 1 along the line A–A' in FIG. 1.
Figure 3:
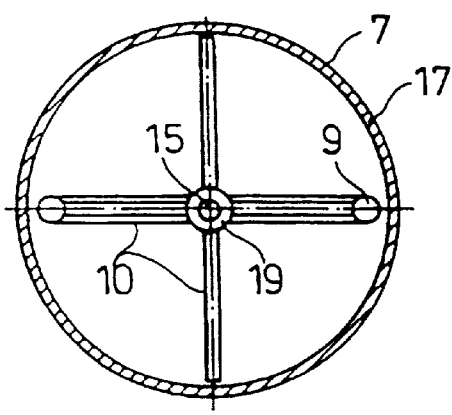
FIG. 3 shows a cross section through the sedimentation section 2 along the line B–B' in FIG. 1.

The crystallization apparatus has two zones: the crystallization zone in the stirred vessel 1 and the sedimentation zone in the sedimentation section 2. The stirred vessel 1 is formed by the curved bottom 3, the cylindrical wall 4 and the lid 5 which is shaped so that it aids the deflection of the upward flow by 180° (see FIG. 1). The circulation of the crystal slurry (crystal suspension) in the crystallization zone 1 is, as shown in FIG. 1, effected by the impeller stirrer 6 which is arranged in the curved bottom 3 and is driven from below (the drive is not shown).

Figure 4A:
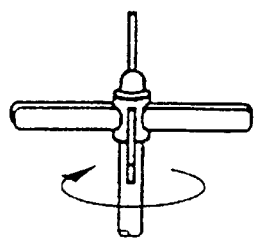
FIGS. 4a–4e show different types of radial-flow stirrers which can be used in place of the preferred impeller stirrer.
Figure 4B:
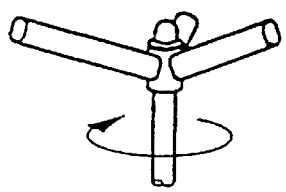
Figure 4C:
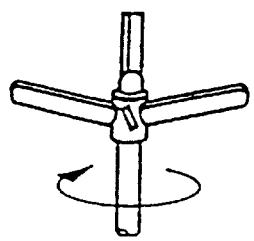
Figure 4D:
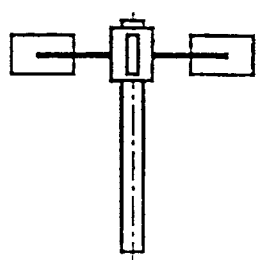
Figure 4E:
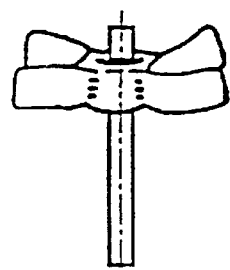

In place of the impeller stirrer, the following types of stirrers can be used: straight-arm stirrers (FIG. 4a, 4b, 4c), flat-paddle stirrers (FIG. 4d) or a CBT turbine (FIG. 4e).

Figure 5:
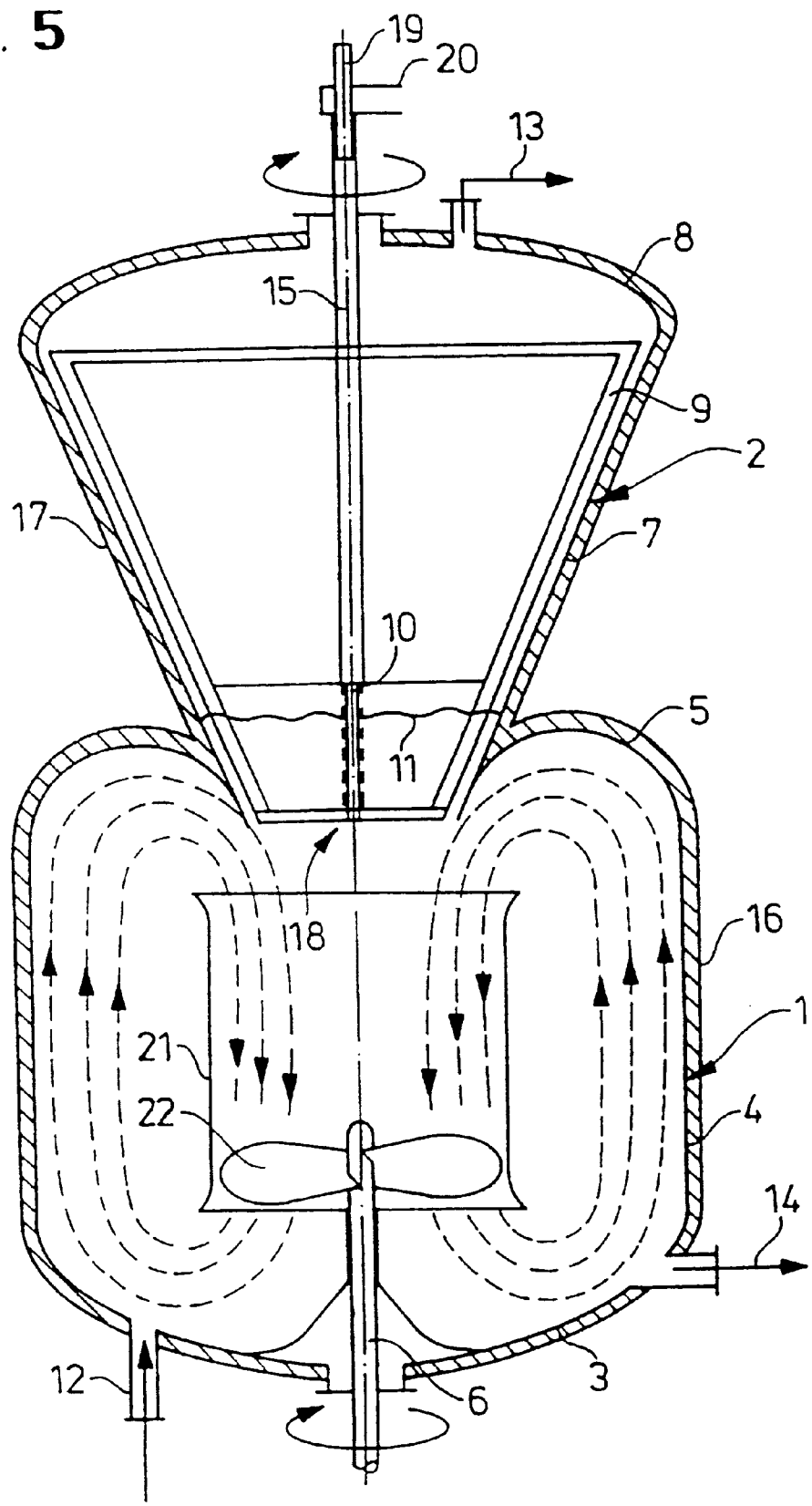
FIG. 5 shows an embodiment of the apparatus with a combination of guide tube and axial-flow stirrer.

FIG. 5 shows a variant of the apparatus shown in FIG. 1, in which the impeller stirrer 6 is replaced by an axial-flow stirrer 22 which is located within a guide tube 21, thus achieving the desired circulation of the crystal suspension.

The sedimentation section 2 is formed by the wall of the truncated cone 7 and the lid 8. Sedimentation section 2 and stirred vessel 1 have a double wall 16, 17 which makes it possible for a heat-transfer medium to flow through the space in-between. The connections and the heat exchanger are not shown. The opening angle of the truncated cone is about 30°. So that the solid particles which settle out here do not collect on the inclined inner wall of the cone 7 but are returned to the crystal slurry in the stirred vessel 1, the heatable frame 9 which runs around the wall rotates in the sedimentation section at a very slow speed (a few revolutions per hour); it is driven from above via the shaft 15 (the drive is not shown). To control the temperature of the frame 9, the feed line 19 and the discharge line 20 provide for heat-transfer medium to flow through the hollow frame 9. In the lower part of the truncated cone 7, the four-bladed blade stirrer 10 is integrated into the frame 9 and prevents transmission of turbulence and rotational flow generated by the impeller stirrer to the sedimentation zone in the sedimentation section 2. The axial dimensions of the stirring blades should preferably be greater than the radius of the inlet opening 18 into the sedimentation section 2, particularly preferably from 1.5 to 2.5 times the radius. In steady-state operation, the crystal suspension goes through the opening 18 into the lower part of the truncated cone 7 and forms a boundary 11 to the crystal-free phase above it. This boundary is relatively insensitive to changes in the speed of the impeller stirrer and to changes in throughput. A prerequisite is that the narrowest cross section of the truncated cone at the transition from the crystallization to the sedimentation zone is correctly dimensioned for the design throughput. Since many parameters influence the position of the crystal boundary 11, e.g. the solids concentration, the particle size distribution, the shape of the crystals, the density difference between the solid and the solution, the intensity of stirring in the crystallization zone and the velocity of the solution, it is not possible to give a simple method for calculating the narrowest cross section. However, a rough estimate of the cross section required can be derived from equality of the settling velocity of the smallest crystal particles and the velocity of the solution.

The inlet 12 for the supersaturated solution feed is located in the vicinity of the circumference of the impeller stirrer, the outlet 13 for the clear solution is located at the top 8 of the sedimentation section 2. The suspension containing the crystals produced is taken from the circulated crystal slurry at distance line 14 and is conveyed to mechanical separation (sieve or centrifuge).

Figure 6:
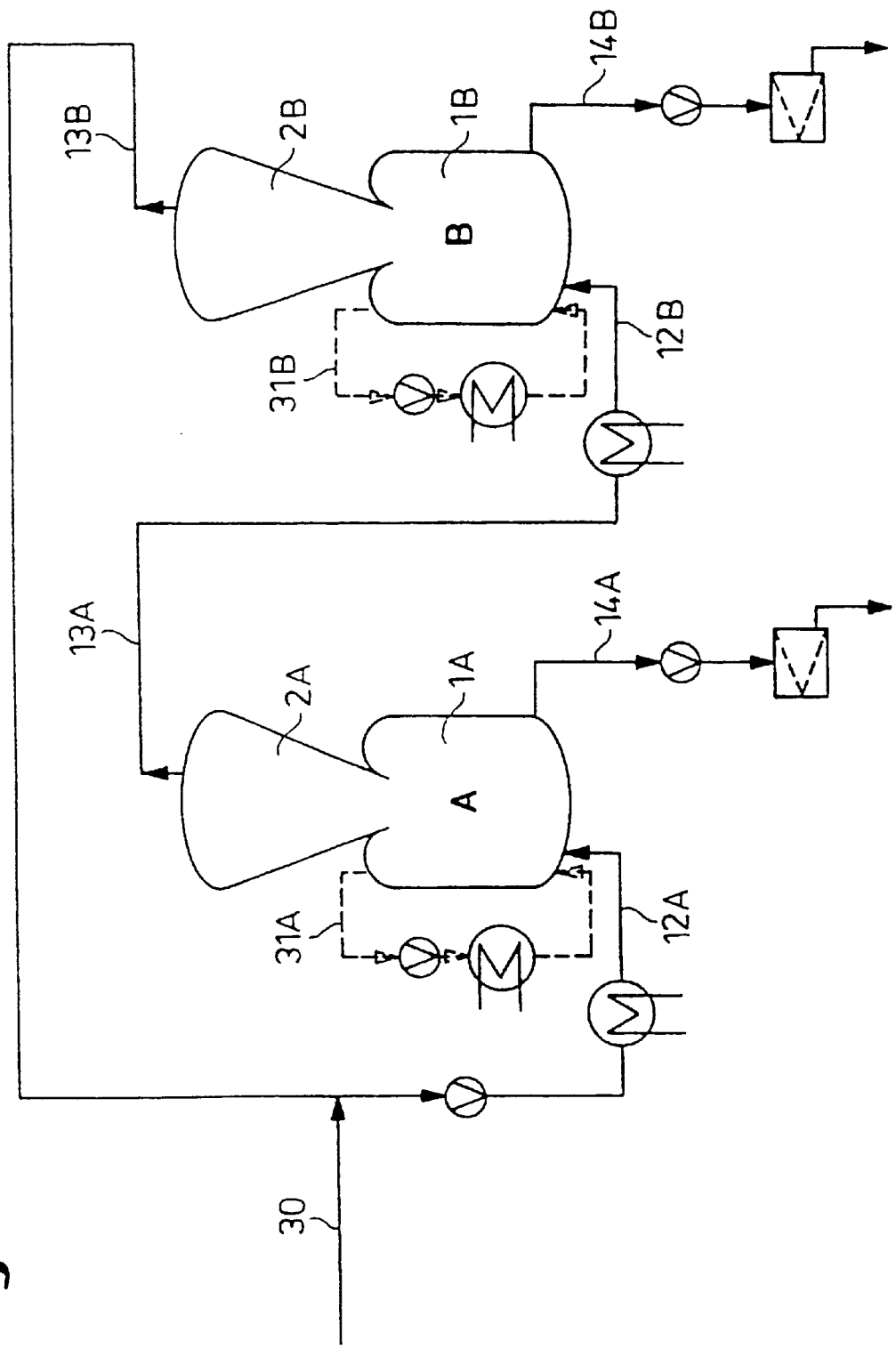
FIG. 6 shows a series arrangement of two crystallization apparatuses.

FIG. 6 schematically shows two crystallizers A and B connected in series. Starting racemate is fed into the circuit at 30. Otherwise, the reference numerals with the suffix A or B in each case denote the same elements as in FIG. 1. One racemate component is discharged at 14A and the other racemate component is discharged at 14B.

Figure 7:
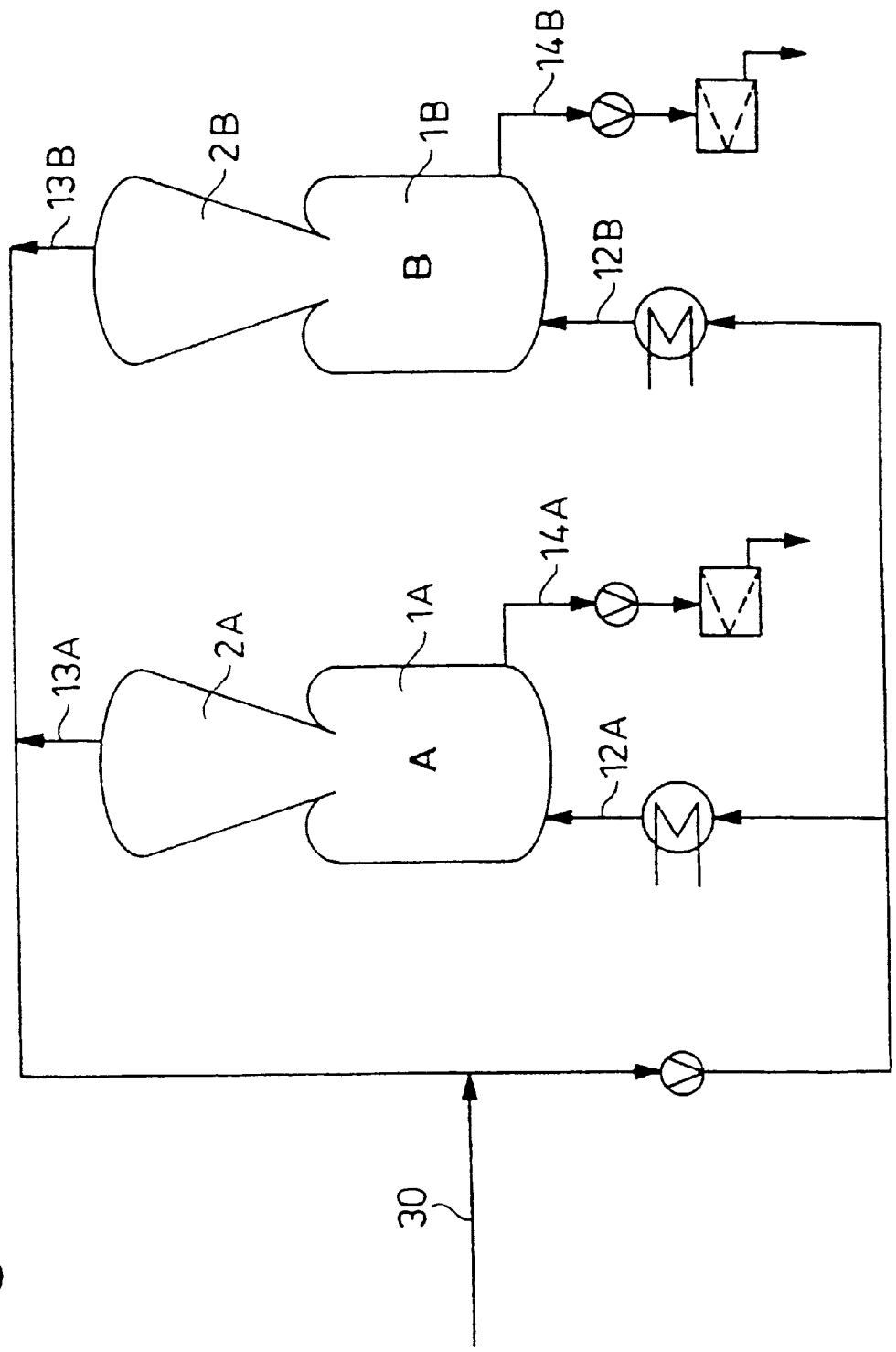
FIG. 7 shows a parallel arrangement of two crystallization apparatuses.

FIG. 7 schematically shows two crystallizers connected in parallel.

To extend the operating time of the crystallizer, a substream of the suspension can be taken from the intensively stirred zone 1 via a pumped circuit (31A or 31B in FIG. 6), heated by from 0.1 to 5° C. in a heat exchanger and returned to zone 1. This measure has been found to be very advantageous since it significantly increases the running time of the crystallizer.

Although a relatively large volume has to be provided for solids separation by sedimentation and this large volume is virtually crystal-free, it has been found in operation that no undesired crystals precipitate despite the long residence time of the solution in the sedimentation zone.

The continuous separation of l- and d-menthyl benzoate was carried out with the aid of the crystallization apparatus described, using two crystallizers according to the invention connected in series.

Two 60 m³ crystallizers of the design according to the invention (cf. FIG. 1) are used for continuous production of 300 kg/h of l- and d-menthyl benzoate. Firstly, the crystallizers are charged with a saturated solution of the racemate of dl-menthyl benzoate in methanol. This solution is then cooled to a temperature which is 0.5° C. below the saturation point. The two crystallizers are then, with pumps and blade stirrer switched off but with impeller stirrer running, each seeded with 500 kg of d- or l-menthyl benzoate crystals. The blade stirrer is then also switched on and both crystallizers are flooded with stirrers running, with each crystallizer first being operated independently using an external pumped circuit. In this state, the temperatures in the two crystallizers are lowered in such a way that the temperature difference between inlet 12 and outlet 13 for the solution does not exceed 0.2–0.3° C. When the specific rotation of the clear solution above the crystals has reached 0°, the two crystallizers are connected in series, i.e. the clear solution enriched in l-menthyl benzoate taken from the first crystallizer at outlet 13 is fed to the second crystallizer via its inlet 12. The solution leaving the second crystallizer at its outlet 13 is replenished with dl-menthyl benzoate and returned to the first crystallizer. The solution subsequently running from the crystallizers has a specific rotation which is opposite to that of the crystals present in the respective crystallizer. The amounts of material crystallized out are metered into the circuit as liquid dl-menthyl benzoate. The amount produced is calculated from the difference in the specific rotation of the solution between inlet and outlet of the respective crystallizer.

The suspension containing the crystals produced is taken from the stirred vessel 1 at the outlet 14 and conveyed to mechanical separation (sieve or centrifuge).

The depleted solution is returned to the reactor after mixing with fresh starting solution.

The quality of the crystals produced is monitored. If the purity drops below 99.6%, the continuous flow through the crystallizers is briefly interrupted, and the temperatures in the crystallizers are increased until the rotation of the solution has the same sign as the crystals present in the respective crystallizer. The crystallizers are then cooled again until the specific rotation is 0°. The crystallizers are then again fed continuously with solution so that production is continued. During production, about 2–3 tonnes of crystals are present in the intensively stirred crystallization zone of the crystallizers. After initially seeding once, production can be carried out in the above-described manner for about 6–8 months.

What is claimed is:

1. A crystallization apparatus for the crystallization of solids from their solutions, comprising an upper part (2) and a lower part (1)

having a heatable and coolable stirred vessel (1) with an agitator (6), optionally a feed line (12) for the crystallization solution and optionally a discharge line (14) for the suspension of the crystallized product, as the lower part and a conical, heatable and coolable sedimentation section (2) having a stirring element (9, 10) running around the wall, optionally a discharge line (13) for the solution depleted in product and an opening (18) to the stirred vessel (1), as the upper part wherein the agitator (6) generates, in the region of the opening (18), a flow of the crystallization solution directed away from the opening (18).

2. An apparatus according to claim 1, wherein the agitator (6) is a radial-flow agitator, driven from below.

3. An apparatus according to claim 1, wherein the agitator (22) is an axial-flow agitator which is driven from below and is located in a guide tube (21).

4. An apparatus as claimed according to claim 1, wherein the stirring element (9, 10) running around the wall is a slow-running blade stirrer (10) driven from below.

5. An apparatus according to claim 4, wherein the blade stirrer (10) has an additional frame (9) which keeps the inner wall of the sedimentation section (2) free of crystals.

6. An apparatus according to claim 5, wherein the frame (9) is heatable or coolable.

7. Apparatus according to claim 1, wherein the cone of the sedimentation section (2) has an opening angle of from 10 to 60°.

8. Apparatus according to claim 1, wherein the sedimentation section (2), the stirred vessel (1) or both has a double wall (7, 17) or (4, 16) through the interior of which a heat-transfer medium is passed for cooling or heating the crystallization solution.

9. An apparatus according to claims 1, wherein the stirred vessel (1) is provided with an additional pumped circulation loop with heat exchanger.

10. Process for separating enantiomers of a racemic mixture using a crystallization apparatus comprising an upper part (2) and a lower part (1), having a heatable and coolable stirred vessel with an agitator (6), optionally a feed line (12) for a solution of the racemic mixture and optionally a discharge line (14) for a suspension of crystallized product as the lower part and a conical, heatable and coolable sedimentation section having a stirring element (9,10) running around the wall, optionally a discharge line (13) for depleted solution and an opening (18) to the stirred vessel, as the upper part, wherein the agitator (6) generates, in the region of the opening (18), a flow of solution directed away from the opening (18), wherein a supersaturated solution of the racemate is fed to the stirred vessel and is intensively mixed with seed crystals of one enantiomer by means of the agitator (6), the flow of the resulting suspension is calmed in the sedimentation section (2) with the aid of the slow-turning element (9,10) running around the wall and any further product crystals formed on the inner wall of the sedimentation section are removed and the solution depleted in the enantiomer is discharged at the top of the sedimentation section.

11. Process according to claim 10, wherein two or more crystallization apparatuses are connected in series and are operated continuously.

12. Process according to claim 11, wherein the discharge line (13) of the first crystallization apparatus is connected to the feed line (12) of the next crystallization apparatus and different seed crystals of the opposite enantiomers are used in the two apparatuses.

13. Process according to claim 10, wherein two or more crystallization apparatuses are connected in parallel and are operated continuously.

14. Process according to claim 10, wherein a substream of the suspension is taken from the intensively stirred stirred vessel (1) via an additional pumped circulation loop with heat exchanger, heated by 0.1–5° C. in the heat exchanger and returned to the stirred vessel (1).

15. A method for resolving racemic mixtures, which comprises separating the isomers of said racemic mixtures by crystallization in the apparatus of claim 1.

* * * * *

UNITED STATES PATENT AND TRADEMARK OFFICE
CERTIFICATE OF CORRECTION

PATENT NO.     : 6,315,966 B1
DATED          : November 13, 2001
INVENTOR(S)    : Hans-Dieter Baumgard et al.

It is certified that error appears in the above-identified patent and that said Letters Patent is hereby corrected as shown below:

<u>Title page,</u>
Item [56], References Cited, U.S. PATENT DOCUMENTS, change "Mizoguchi" to
-- Ajinomoto --; and change "7/1975" to -- 6/1975 --

Signed and Sealed this

Fifteenth Day of April, 2003

JAMES E. ROGAN
*Director of the United States Patent and Trademark Office*